United States Patent [19]

Stump

[11] 4,019,400
[45] Apr. 26, 1977

[54] AUXILIARY TWO-SPEED TRANSMISSION

[76] Inventor: James M. Stump, 8642 E. Main St., Galesburg, Mich. 49053

[22] Filed: Aug. 28, 1975

[21] Appl. No.: 608,555

Related U.S. Application Data

[63] Continuation of Ser. No. 533,137, Dec. 16, 1974, abandoned, which is a continuation of Ser. No. 341,958, March 16, 1973, abandoned.

[52] U.S. Cl. .................................. 74/333; 74/342; 74/363; 74/375; 192/53 R
[51] Int. Cl.² .......................................... F16H 3/08
[58] Field of Search ............ 74/325, 329, 333, 356, 74/363, 366, 369, 370, 375, 343, 342; 192/53 R, 53 B, 53 A

[56] References Cited

UNITED STATES PATENTS

| | | | |
|---|---|---|---|
| 1,168,899 | 1/1916 | Neuteboom | 74/325 X |
| 1,659,437 | 2/1928 | Merryweather | 74/325 |
| 1,788,701 | 1/1931 | Bethune | 74/375 X |
| 1,971,166 | 8/1934 | Read | 74/325 |
| 1,989,271 | 1/1935 | Curtis | 74/343 |
| 2,085,322 | 6/1937 | Lapsley | 74/343 X |
| 2,220,197 | 11/1940 | Ariens | 74/326 |
| 3,611,832 | 10/1971 | Vollmer | 74/363 X |

FOREIGN PATENTS OR APPLICATIONS

| | | | |
|---|---|---|---|
| 1,550,838 | 12/1969 | Germany | 74/325 |

*Primary Examiner*—Samuel Scott
*Assistant Examiner*—Carl F. Pietruszka
*Attorney, Agent, or Firm*—Gordon W. Hueschen

[57] ABSTRACT

A transmission is provided having a housing, a power input shaft rotatably mounted at one end, a power output shaft rotatably mounted at the other end coaxially with the power input shaft, a splined clutch member affixed to the end of one of the shafts having a gear engaged over a portion thereof, a second splined clutch member freely rotatably mounted on the other shaft and having a gear engageably mounted over a portion thereof, the end of each clutch-engaging member extending beyond each gear, a splined countershaft rotatably supported in the housing and having a gear engaged at each end engaging the gears mounted on the power input and output shafts, a third splined clutch member affixed to one of the shafts and positioned intermediate the first and second splined clutch members and of the same diameter as said clutch members, a clutch sliding ring or coupling member mounted over the cylindrical clutch member having a splined bore engaging the third clutch member and axially slidable with respect thereto and adapted to engage alternatively the first or said second clutch members and to couple them to the third clutch member and a groove provided in the clutch sliding ring engaging a fork-operating member for sliding the clutch sliding ring alternatively in engagement with the first clutch member or the second clutch member, thereby providing either direct drive or ratioed drive between the power input shaft and the power output shaft. In a preferred form of the invention the gears are all mounted on splined shafts of the same diameter and configuration to make them capable of being rearranged to provide different gear ratios.

3 Claims, 2 Drawing Figures

AUXILIARY TWO-SPEED TRANSMISSION

This application is a Continuation of my prior-filed, co-pending application Ser. No. 533,137, filed Dec. 16, 1974, now abandoned, which is in turn a Continuation of my co-pending, earlier filed application Ser. No. 341,958, filed Mar. 16, 1973, also now abandoned.

BACKGROUND OF THE INVENTION

1. Field of the Invention.

The present invention relates to power transmissions and more particularly refers to an auxiliary transmission for use with an automotive vehicle in combination with the existing transmission to provide alternatively direct drive or ratioed drive, either overdrive or underdrive.

2. Prior Art.

Innumerable forms of power transmissions have been disclosed. Among such disclosures are U.S. Pat. Nos. 447,334, 1,232,608, 1,780,858, and 3,099,165. However, none of the prior art has disclosed a simple two-speed auxiliary transmission to be used in conjunction with conventional automobile transmissions for providing either direct drive or alternatively overdrive or underdrive, the gear sets being interchangeable so that with the same transmission the gears may be assembled to provide either overdrive or underdrive.

SUMMARY OF THE INVENTION

It is an object of the present invention to provide an auxiliary transmission for use in automotive vehicles capable of providing two alternative gear ratios by a simple gear shift. It is a further object of the invention to provide an auxiliary transmission having gears which are interchangeably mounted so that by a simple reassembly the gear ratio of the transmission in non-direct drive may be varied from overdrive to underdrive. It is still further an object to provide an auxiliary transmission which is relatively simple in construction and operation and may be reliably operated over a long period of time. It is still an additional object to provide an auxiliary gear shift which may be relatively inexpensively fabricated. Still other objects will readily present themselves to one skilled in the art upon reference to the ensuing specification, the drawing, and the claims.

According to the invention, a two-speed auxiliary transmission is provided having a housing, a power input shaft having a splined clutch member thereon and supporting a gear on a portion of the splined member, a power output shaft rotatably mounted having a splined clutch member mounted thereon and a gear engageably mounted on a portion of the splined clutch member. A splined countershaft is also rotatably mounted in the housing and has a gear engaged at each end, one engaged with the power input shaft gear and the other engaged with the power output shaft gear, and an internally splined clutch ring or coupling member is mounted over the splined clutch members and causes the power output shaft to be driven alternatively directly or through the countershaft gear train.

DESCRIPTION OF THE PREFERRED EMBODIMENT

Figure 2:
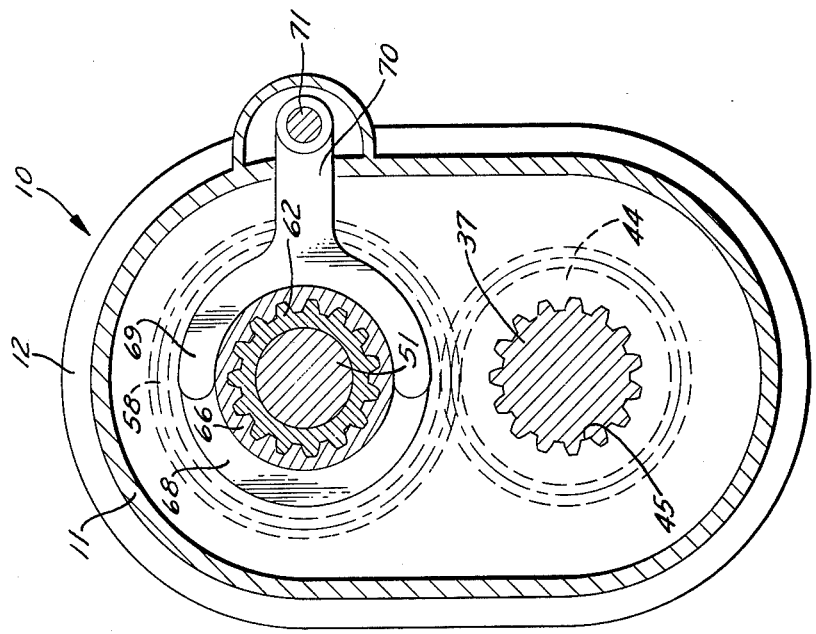
FIG. 2 is a cross-sectional view taken at the line II—II of FIG. 1, looking in the direction of the arrows.

Referring to the drawing, the auxiliary gear assembly 10 of the invention is shown comprising a housing 11, a mounting flange 12 at the lip of the housing, and an end plate 13 affixed to the housing by means of bolts 14. At one end of the housing 11 is a bearing supporting housing 15 in which a power input or driving shaft 16 is rotatably mounted in a conventional ball bearing and race assembly 17 retained in a bearing recess 18 and maintained in place by a retaining ring 19 mounted in an annular groove 26. The power input shaft 16 is also journaled in a ball bearing and race assembly 20 mounted in a recess 21 and separated from the ball bearing and race assembly 17 by means of a tubular spacer 22.

Affixed to the inner end of the power input shaft is a splined clutch sleeve or clutch-engaging member 23 divided into two portions, one a gear-engaging portion 24 and the other a clutch-engaging portion 25. A gear 30 having a complementary splined bore 31 is engageably mounted over the gear-engaging portion 24. A retaining ring 32 mounted in an annular groove 33 maintains the gear in place. A splined countershaft 37 is rotatably mounted in ball bearing and race assemblies 38 and 39. A gear 40 having a splined bore 41 is mounted at one end of the shaft 37 and maintained in place by a retaining ring 42 mounted in an annular groove 43. A second gear 44 having a splined bore 45 is mounted over the other end of the shaft 37 and maintained in place by a retaining ring 46 mounted in an annular groove 47.

Figure 1:
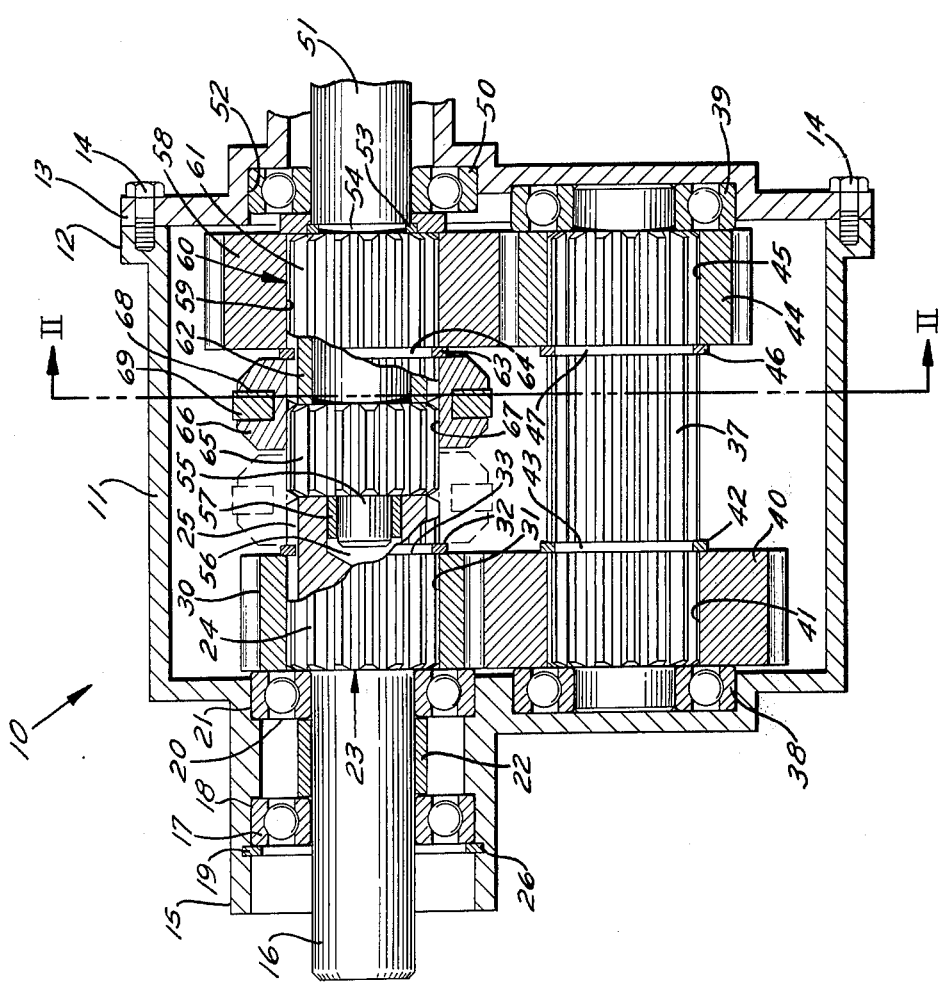
FIG. 1 is a side elevation partly in cross-section of the apparatus of the invention.

As shown in FIG. 1, a power output or driven shaft 51 is rotatably mounted at the other end of the transmission and journaled in a ball bearing and race assembly 52 supported in a bearing housing 50 provided in the end plate 13 and maintained in place by a retaining ring 53 mounted in an annular recess 54. The reduced end 55 of the shaft 51 is mounted in a bore 56 provided in the clutch sleeve 23, and journaled in a sleeve bearing 57.

A splined clutch sleeve or clutch-engaging member 60 is freely rotatably mounted on the shaft 51 and is divided into two portions comprising a gear-engaging and supporting portion 61 and a clutch-engaging portion 62. A gear 58 having a complementary splined bore 59 is engageably mounted over the gear-engaging portion 61, and maintained in place by a retaining ring 63 mounted in an annular groove 64. A splined clutch ring engaging and supporting member 65 which may be in the form of a sleeve is affixed to the shaft 51, and is of the same diameter and same spline pattern as the splined clutch sleeves 23 and 60. A clutch sliding ring 66 having a splined bore 67 complementary to the splined clutch ring supporting member 65 and splined clutch sleeves 23 and 60 is axially slidably mounted over the supporting member 65 and arranged to be alternatively engageable with the clutch sleeves 23 and 60. The clutch sliding ring 66 is provided with an outer annular groove 68 in which a fork 69 rides, the fork having an arm 70 connected to a fork-operating rod 71.

The operation for shifting the gear is very simply carried out. In FIG. 1, the position of the clutch sliding ring is shown in solid lines wherein it engages both the splined supporting member 65 and the clutch-engaging portion 62 of the splined clutch sleeve 60. In this position the power input shaft 16 rotates the gear 30 which in turn rotates the gear 40, and through the shaft 37 the gear 44. The gear 44 operates the gear 58 which is engaged by the splines of the gear-engaging portion 61. The clutch-engaging portion 62 is engaged with the splined supporting member 65 through the clutch sliding ring 66. Consequently, the gear 58 is coupled to the shaft 51, and the transmission operates as either an overdrive or underdrive, depending on how the gears are arranged. In order to shift to direct drive, the fork-operating rod 71 is moved, causing the fork 69 to move the clutch sliding ring 66 axially until it engages the splined clutch-engaging portion 25 as shown by broken lines. At the same time, the splined clutch-engaging portion 62 is disengaged from the splined supporting member 65, now permitting the gear 58 and splined clutch sleeve 60 to rotate freely on the shaft 51. With the splined member 25 now engaged with the splined supporting member 65, the shaft 51 is directly driven by the shaft 16. Shifting to the overdrive or underdrive position is accomplished by reversing the procedure.

As described above, the splined clutch sleeve 23, the splined clutch sleeve 60, the splined supporting member 65, and the splined countershaft 37 all have the same diameter and same spline pattern. Consequently, the gears all have the same splined complementary bore and any gear can be interchangeably mounted at any of the four positions shown in the drawing. This may be accomplished by removing the end plate 13, the various retaining rings, removing the gears, and replacing them in the desired position. The retaining rings may then be replaced and the end plate 13 remounted. By a complete changing of the gear arrangement, for example interchanging the gear 30 with the gear 40 and interchanging the gear 58 with the gear 44, the transmission ratio may be changed from overdrive to underdrive. Moreover, by utilizing other sets of gears almost any desired ratio may be provided. In the arrangement shown in the drawing, the ratio is 1.8 maximum ratio per gear set, the arrangement shown being in underdrive. By interchanging the four gears, the same ratio may be obtained in overdrive. Alternatively, by using other arrangements, as for example equal size gears on the power input side, either overdrive or underdrive may be accomplished merely by changing the two gears at the power output end. Additionally, although the structure and operation have been described designating the shaft 16 as the power input shaft and the shaft 51 as the power output shaft, this arrangement could be reversed so that the shaft 51 is utilized as the power input shaft and the shaft 16 as the power output shaft.

The auxiliary transmission of the invention has many advantages over prior art devices. First, a very simple and inexpensive means is provided for changing the gear ratio from direct drive to either overdrive or underdrive. Second, because uniformly dimensioned splined shafts are used throughout with complementary splined bores in the gears, the gears may be interchanged to provide various ratios in either underdrive or overdrive. Additionally, the transmission may be readily assembled from relatively inexpensive parts and provides reliable operation over extended periods of time.

It is to be understood that the invention is not to be limited to the exact details of operation or exact structures shown and described, as obvious modifications and equivalents will be apparent to one skilled in the art.

I claim:
1. In a transmission comprising:
1. a housing,
2. a power input shaft and a power output shaft rotatably mounted in said housing in coaxial arrangement, each of said shafts having one end journalled in said housing, and the other ends being both axially coextensive and mutually constrained, by virtue of one said shaft end being rotatably journalled within the other said shaft end,
3. a first externally splined clutch member affixed to one of said shafts,
4. a second externally splined clutch member freely rotatably mounted over the other of said shafts,
5. a third externally splined clutch member affixed to said shaft having said second clutch member freely rotatably mounted thereon and positioned intermediate and adjacent said first two splined clutch members, said splined clutch members being characterized by a number of equally spaced grooves cut in the clutch member so as to form a series of projecting keys,
6. a coupling member having an internally splined bore having a spline configuration complementary to the spline configuration of said clutch members and being mounted on said third splined clutch member and adapted to slide axially thereon and to couple said third splined clutch member alternatively to said first or second splined clutch member,
7. means for moving said coupling member axially,
8. a gear train comprising a pair of gears having internally splined bores mounted one on a portion of each of said first and second splined clutch members, a further portion of each of said splined clutch members extending beyond said gears and being engageable by said coupling member; an externally splined counter shaft journalled in said housing parallel to said input and output shafts; and a second pair of gears having internally splined bores mounted one on each end of said splined countershaft, each gear being engaged with one of the gears mounted on said splined clutch members, whereby when said coupling member is moved to a position wherein said second and third splined clutch members are coupled together, said power input shaft drives said power output shaft through said countershaft and associated gears at a rotative speed determined by the relationship of said gears, and whereby when said coupling member is moved to the other position coupling said first and third splined clutch members together, said power input shaft directly drives said power output shaft at the same rotative speed as that of said power input shaft;

the improvement in which the splined clutch members and the splined bores of said coupling member and said pair of gears all have the same diameter and spline configuration, so that each gear fits all of the splined clutch members, and in which the splined countershaft and the splined bores of the second pair of gears have the same diameter and spline configuration as the splined clutch members and the splined bores of the first pair of gears, whereby in dissembling the transmission, said gears can be removed off the said other ends of said input and output shafts and whereby the first and second pairs of gears are interchangeable.

2. A transmission according to claim 1, wherein said third splined clutch member is affixed to said power output shaft, and said second splined clutch member is freely rotatable about said power output shaft.

3. A transmission according to claim 2, wherein said gears are retained in place by removable retaining rings mounted in annular grooves, thereby facilitating disassembly and reassembly of said gears.

* * * * *